(12) United States Patent
Yao et al.

(10) Patent No.: US 9,998,014 B2
(45) Date of Patent: Jun. 12, 2018

(54) POWER CONVERTER WITH MULTIPLE OUTPUT VOLTAGE LEVELS AND RELATED METHODS

(71) Applicant: DIALOG SEMICONDUCTOR INC., Campbell, CA (US)

(72) Inventors: Jianming Yao, Campbell, CA (US); Fuqiang Shi, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days. days.

(21) Appl. No.: 15/826,591

(22) Filed: Nov. 29, 2017

(65) Prior Publication Data
US 2018/0083544 A1 Mar. 22, 2018

Related U.S. Application Data

(63) Continuation of application No. PCT/US2015/057255, filed on Oct. 23, 2015.

(51) Int. Cl.
*H02M 3/335* (2006.01)

(52) U.S. Cl.
CPC ... *H02M 3/33507* (2013.01); *H02M 3/33523* (2013.01)

(58) Field of Classification Search
CPC ......... H02M 3/33507; H02M 3/33515; H02M 3/33523
USPC ........................................... 363/21.12–21.18
See application file for complete search history.

(56) References Cited

U.S. PATENT DOCUMENTS

| | | | |
|---|---|---|---|
| 2009/0257251 A1* | 10/2009 | Su | H02M 3/33523 363/21.15 |
| 2011/0157936 A1 | 6/2011 | Huynh et al. | |
| 2012/0008345 A1 | 1/2012 | Tang et al. | |
| 2012/0008346 A1* | 1/2012 | Kawamura | H02M 3/33523 363/21.15 |
| 2014/0268924 A1 | 9/2014 | Tang et al. | |

OTHER PUBLICATIONS

PCT Search Report and Written Opinion dated Jul. 22, 2016 from corresponding International Application No. PCT/US2015/057255 filed Oct. 23, 2015.
Written Opinion of the International Preliminary Examining Authority dated Oct. 2, 2017 from corresponding International Application No. PCT/US2015/057255 filed Oct. 23, 2015.

* cited by examiner

*Primary Examiner* — Nguyen Tran
(74) *Attorney, Agent, or Firm* — Haynes and Boone, LLP (57) ABSTRACT

A variable-level flyback power converter is configured to provide an accurate output voltage at various regulation levels. The variable-level flyback power converter may include a switch coupled to a secondary winding of a transformer, a diode coupled to a primary winding of the transformer, and a controller coupled to the switch. The controller may scale an initial reference voltage based on a desired output voltage and a forward voltage drop across the diode, compare the scaled reference voltage with a feedback voltage sensed at an auxiliary winding of the transformer to generate an error signal, and modulate a pulse signal provided to the switch based on the error voltage.

14 Claims, 6 Drawing Sheets

POWER CONVERTER WITH MULTIPLE OUTPUT VOLTAGE LEVELS AND RELATED METHODS

CROSS-REFERENCE TO RELATED APPLICATIONS

This application is a continuation of International Application No. PCT/US2015/057255 filed Oct. 23, 2015, which is hereby incorporated by reference in its entirety.

TECHNICAL FIELD

This application relates to switching power converters, and more particularly switching power converters configured to provide an output voltage at various regulation levels.

BACKGROUND

The explosive growth in mobile electronic devices such as smartphones and tablets creates an increasing need in the art for compact and efficient switching power converters so that users may recharge these devices. A flyback switching power converter is typically provided with a mobile device as its transformer provides safe isolation from AC household current. This isolation introduces a problem in that the power switching occurs at the primary side of the transformer but the load is on the secondary side. The power switching modulation for a flyback converter requires knowledge of the output voltage on the secondary side of the transformer. Such feedback can be obtained through opto-isolators bridging from the secondary side to the primary side but this adds to cost and control complexity. Thus, primary-only feedback techniques have been developed that use a feedback voltage at an auxiliary winding on the primary side, which reflects the output voltage on the secondary side in each switching cycle.

Figure 1:
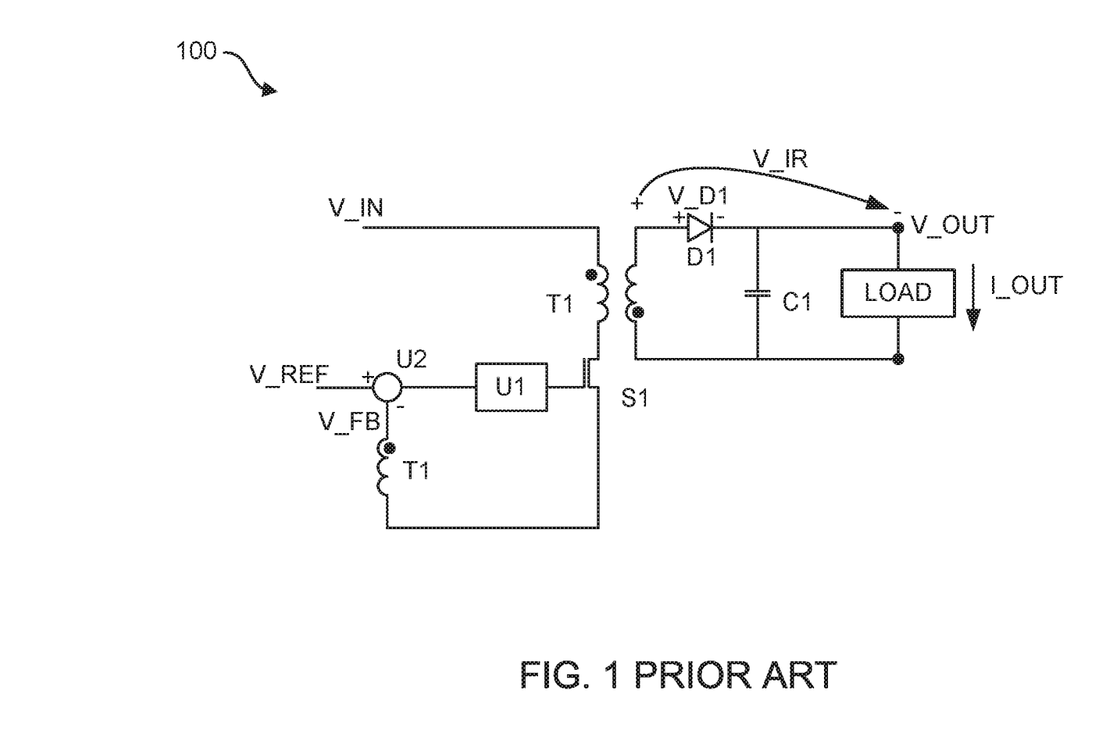
FIG. 1 is a diagram of a conventional flyback converter.
Figure 2A:
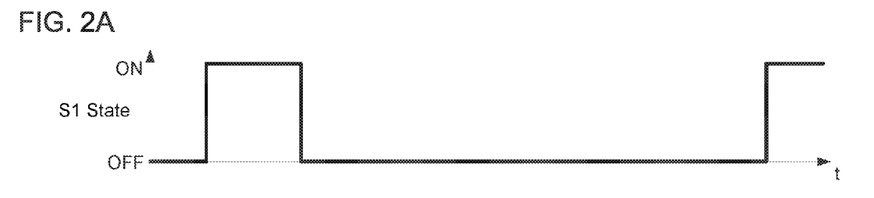
FIG. 2 illustrates waveforms associated with the flyback converter of FIG. 1.
Figure 2B:
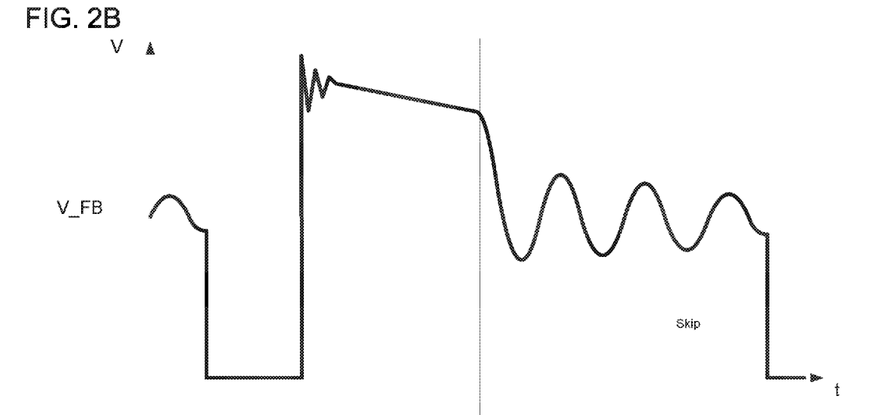
Figure 2C:
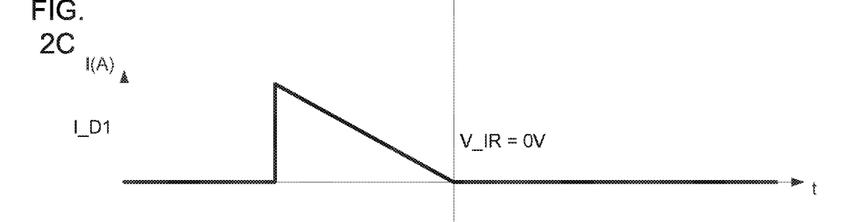

In an example flyback converter 100 that utilizes primary-only feedback, as shown in FIG. 1, a feedback voltage V_FB signal is provided by sensing a voltage at a primary auxiliary winding of a transformer T1. FIG. 2A-C shows waveforms associated with flyback converter 100 of FIG. 1. FIG. 2A shows a waveform for an ON and OFF state of a power switch S1, FIG. 2B shows a waveform for the feedback voltage at the primary auxiliary winding, and FIG. 2C shows a waveform for secondary current (current in the secondary winding of the transformer).

When power switch S1 is placed in the ON state, primary current starts to flow through the primary winding of transformer T1. Since a diode D1 coupled to the secondary winding of transformer T1 is reverse biased, the secondary current is zero, causing energy to be stored in the core of transformer T1.

When power switch S1 is switched to the OFF state, diode D1 becomes forward biased, the secondary current pulses high, and the energy stored in transformer T1 starts to be delivered to the secondary. This can be observed by the forward current through diode D1. As energy is delivered to the secondary, current through diode D1 decreases linearly. Once all of the energy stored in transformer T1 has been expended, the secondary current through diode D1 ramps down and reaches 0 A (amperes) as power is delivered to the load. This point is commonly referred to as the transformer reset point. Further, the delay between the power switch off time and the secondary current ramping to zero is denoted as the transformer reset time T_RST.

During the period between the turn OFF of power switch S1 and the transformer reset point, the relationship between the feedback voltage across the auxiliary winding and the output voltage can be expressed by "V_FB=((V_OUT)−(V_D1+V_IR))/N," where V_FB=feedback voltage across the auxiliary winding, V_OUT=output voltage, N=auxiliary winding to secondary winding turns ratio, V_D1=forward voltage drop across diode D1, and V_IR=voltage drop due to secondary I×R losses. Therefore, to achieve an accurate representation of output voltage V_OUT using feedback voltage V_FB, it is desirable to obtain feedback voltage V_FB by sampling the auxiliary winding voltage at the transformer reset point. At this point, V_IR losses equal 0 V (Volts).

Although the ideal sampling point for feedback voltage V_FB is the transformer reset point, special care should be taken to insure the feedback voltage V_FB sampling point does not occur after the transformer reset point, as the voltage across the auxiliary winding then does not represent output voltage V_OUT. Therefore, the sampling point is programmed to occur when secondary current is at a very low point, such as just prior to the transformer reset point where V_IR =~0 V. For example, if the sampling point is at a fixed time set-back from the transformer reset point on a cycle-by-cycle basis, V_IR will have a constant value.

Another reason to insure the feedback voltage V_FB sampling point occurs when the secondary current is at a low and fixed value is to insure forward voltage drop V_D1 across diode D1 is a constant value on a cycle-by-cycle basis. The forward voltage drop of commonly used output rectifiers such as diode D1 are typically in the range of 0.2 V at the current levels where the feedback voltage V_FB signal is obtained. The feedback voltage V_FB signal at the transformer reset time T_RST is proportional to output voltage V_OUT (based upon the turn ratio in the transformer and other factors) offset by forward voltage drop V_D1. Primary-only feedback techniques use this feedback voltage V_FB signal to efficiently modulate the power switching and thus modulate the output voltage V_OUT, such as to 5 V.

However, having a fixed output voltage such as 5 V is problematic for fast charging of modern devices. In particular, it is conventional for a switching power converter to couple to the device being charged through a standard interface such as a Universal Serial Bus (USB) interface. The USB interface includes a differential pair of signals (D+ and D−) for signaling and also provides power and ground. With regard to the delivery of power, a USB cable can only support a certain amount of current. For example, the USB 2.0 standard allows for a maximum output current of 500 mA, whereas the USB 3.0 standard can support a maximum output current of 900 mA. Traditionally, the delivery of power through a USB cable used a voltage of 5 V. But modern mobile device batteries have relatively large storage capacities such as several thousand mA (milliamps). The charging of such batteries, even at the increased output currents allowed in the USB 3.0 standard, will thus be delayed if the power is delivered using a 5 V power supply voltage. This is particularly true in that the switching power converter, the cable, and the receiving device all present a resistance to the output current.

To enable a rapid charge mode in light of the output current limitations and associated losses from device resistances, it is now becoming conventional to use markedly higher output voltages over the USB cable. For example, rather than use the conventional USB output voltage of 5 V, multi-level power converters configured to provide a regulated output voltage at multiple regulation levels (e.g., multiple settings) have been developed, such as the "quick charge" power converters that are used for USB-based portable equipment. A multi-level power converter may support rapid charge modes using output voltages of 9 V, 12 V, or even 19 V. In addition to the standard 5 V setting, the multi-level power converter may thus provide a higher regulated output voltage (e.g. 9 V, 12 V, or 19 V) depending on the portable device that is connected to the multi-level power converter. The increased output voltages allow the multi-level power converter to deliver more power over the USB cable without exceeding the maximum output current limitations. As many legacy devices can only accept the standard 5V from a USB cable, the multi-level power converter will engage in an enumeration process with the device being charged to determine if the higher output voltages are supported. This enumeration may occur over the differential D+ and D− pins. Through the enumeration, the multi-level power converter and the enumerated device may change the USB output voltage to an increased level that is supported by the enumerated device. The result is considerably reduced charging time, which leads to greater user satisfaction.

Figure 3:
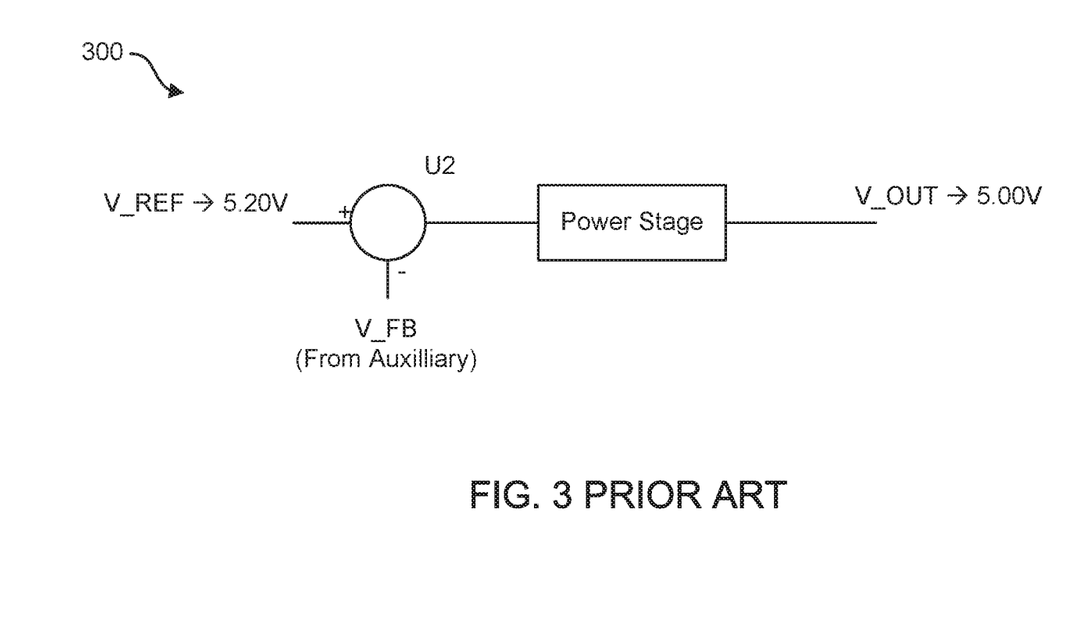
FIG. 3 is a diagram of a conventional flyback converter with an offset reference voltage.

Although primary-only feedback techniques advantageously eliminate the need for secondary-side regulators and opto-isolators, problems have arisen in their implementation. For example, there is a voltage offset that must be compensated due to forward voltage drop V_D1 of diode D1. An example single-voltage output power converter 300 is shown in FIG. 3 in which the reference voltage is offset to compensate for the forward voltage drop V_D1. For example, if the desired output voltage is 5 V, and a reference voltage of 5 V provides an output voltage of 4.8V due to the forward voltage drop of diode D1, the reference voltage V_REF is offset to 5.2 V to obtain the desired output voltage of 5 V (assuming a turns ratio N of 1). However, this creates a problem for multi-level power converters as scaling the reference voltage V_REF to obtain a higher desired output voltage results in an inaccurate output voltage.

For example, a multi-level power converter may have three output voltage settings, 5 V, 12 V, and 19 V. The multi-level power converter uses an initial reference voltage V_REF0 (e.g., 5.2 V) that is offset from the initial output voltage V_OUT0 of 5 V as in FIG. 3. Then, for the other desired output voltages V_OUT1, 12 V and 19 V, the initial reference voltage V_REF0 is scaled by a ratio of the desired output voltage V_OUT1 and the initial output voltage V_OUT0. This is represented by the formula:

$$V_{REFn} = V_{REF0} \times \frac{V_{OUT1}}{V_{OUT0}}$$

The initial reference voltage V_REF0 is scaled by 12/5 to obtain the output voltage of 12 V and by 19/5 to obtain the output voltage of 19 V. However, as mentioned above, since there is a voltage offset between the initial reference voltage V_REF0 and the initial output voltage V_OUT0 mainly due to the forward voltage drop V_D1 across diode D1, scaling the initial reference voltage V_REF0 results in the inaccurate setting of the 12 V and 19 V levels. This is because the offset does not scale with the output voltage setting since the forward voltage drop V_D1 across the output diode D1 remains constant regardless of the output voltage. This is shown by Table 1.

TABLE 1

| Desired V_OUT | Scaling Ratio | V_REF | V_OUT |
|---|---|---|---|
| +5.0 V | 1 | +5.2 V (Set at final test) | +5.0 V |
| +12.0 V | 2.4 (12/5) | +12.48 V | +12.28 V |
| +19.0 V | 3.8 (19/5) | +19.76 V | +19.56 V |

Figure 4:
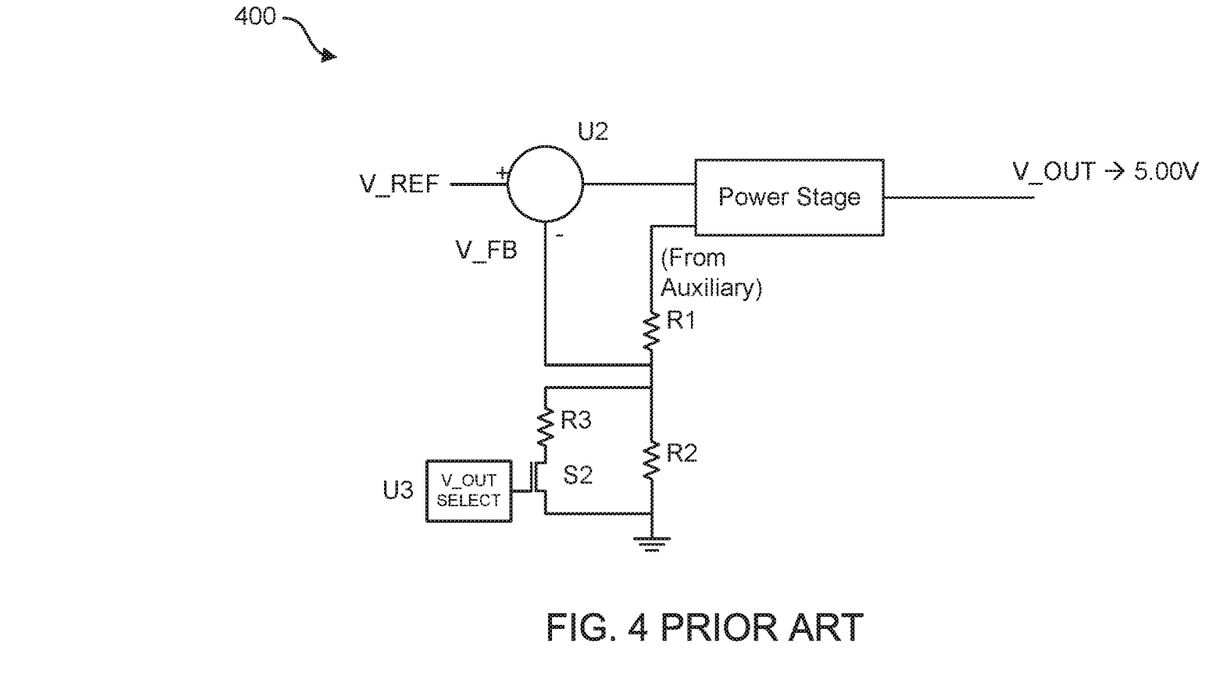
FIG. 4 is a diagram of a conventional flyback converter with a voltage divider coupled to an auxiliary winding.

To adjust an inaccurate output voltage, conventional multi-level power converters trim the voltage at the auxiliary winding using feedback voltage dividers. As shown in FIG. 4, an example multi-level power converter 400 includes a feedback voltage divider formed by resistors R1 and R2 to provide a trimmed feedback voltage V_FB. Multi-level power converter 400 also includes a resistor R3 and a rapid-charge mode switch S2 coupled between a feedback voltage input of a comparator U2 and ground. If rapid-mode switch S1 is switched on, resistors R3 and R2 are coupled in parallel such that the resistance between the feedback voltage input and ground drops. Feedback voltage V_FB will thus drop when switch S1 is switched on, which causes an error signal from comparator U2 to increase and, in response, output voltage V_OUT will increase. Conversely, if the rapid-mode switch S2 is switched off, output voltage V_OUT will drop in response to the increase in feedback voltage V_FB. A mode control circuit U3 controls the rapid-charge mode switch S2 to select between the output voltage settings. The resistor values of resistors R1, R2, and R3 that results in the desired output voltage may be determined and set through trial and error testing. Depending on the number of output voltage settings, conventional multi-level power converters may include multiple resistors and switches so that the auxiliary winding voltage is trimmed by a different voltage divider or combination of resistors for each voltage setting. The more settings a multi-level power converter has, the more resistors and switches are required, as a separate voltage divider or combination of resistors is required for each voltage setting. When a desired output voltage is determined, the switches are used to couple the auxiliary winding to a voltage divider corresponding to that output voltage.

However, trimming the auxiliary winding voltage and/or the reference voltage using multiple resistors and switches increases the number of components required for power converters, which increases the cost of such power converters and also increases the chances of component failure. Also, trimming the auxiliary winding voltage and/or reference voltage requires costly post-production tests. Moreover, the number of output voltage settings that may be provided by trimming of feedback voltage V_FB is limited since a different combination of resistors or voltage dividers is required for each output voltage setting. Indeed, conventional multi-level power converters cannot vary an output voltage on a continuum, but typically only can support three to five pre-set voltages.

Accordingly, there is a need in the art for improved flyback converters and flyback control techniques to provide an output voltage at various regulation levels.

SUMMARY

A multi-level power converter such as a variable-level flyback power converter configured to provide an accurate output voltage at various regulation levels and related methods is provided. The variable-level flyback power converter may include a switch coupled to a primary winding of a transformer, a diode coupled to a secondary winding of the transformer, and a controller coupled to the switch. The controller may scale an initial reference voltage based on a desired output voltage and a forward voltage drop of the diode, compare the scaled reference voltage with a feedback voltage sensed at a primary-side auxiliary winding of the transformer to generate an error signal and modulate a pulse signal provided to the switch based on the error signal. The controller may scale the initial reference voltage by multiplying the initial reference voltage with a scaling factor of the sum of the desired output voltage and the forward voltage drop over the sum of the default output voltage and the forward voltage drop.

A method for providing an accurate output voltage at various regulation levels may include scaling an initial reference voltage based on a desired output voltage and a forward voltage drop of a diode coupled to a primary winding of a transformer, comparing the scaled reference voltage with a feedback voltage sensed at a primary-side auxiliary winding of the transformer to generate an error signal, and modulating a pulse signal provided to a switch coupled to a secondary winding of the transformer based on the error signal.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need in the art for improved flyback converters and flyback control techniques, variable-level power converters configured to provide an output voltage at various regulation levels and related methods are provided. A variable-level flyback power converter that utilizes indirect sensing of the output voltage is configured to provide an accurate output voltage at various regulated output voltage levels by utilizing a process to scale the reference voltage. Thus, the need for costly post-production tests and trim is eliminated or reduced compared to conventional multi-level flyback power converters.

Figure 5:
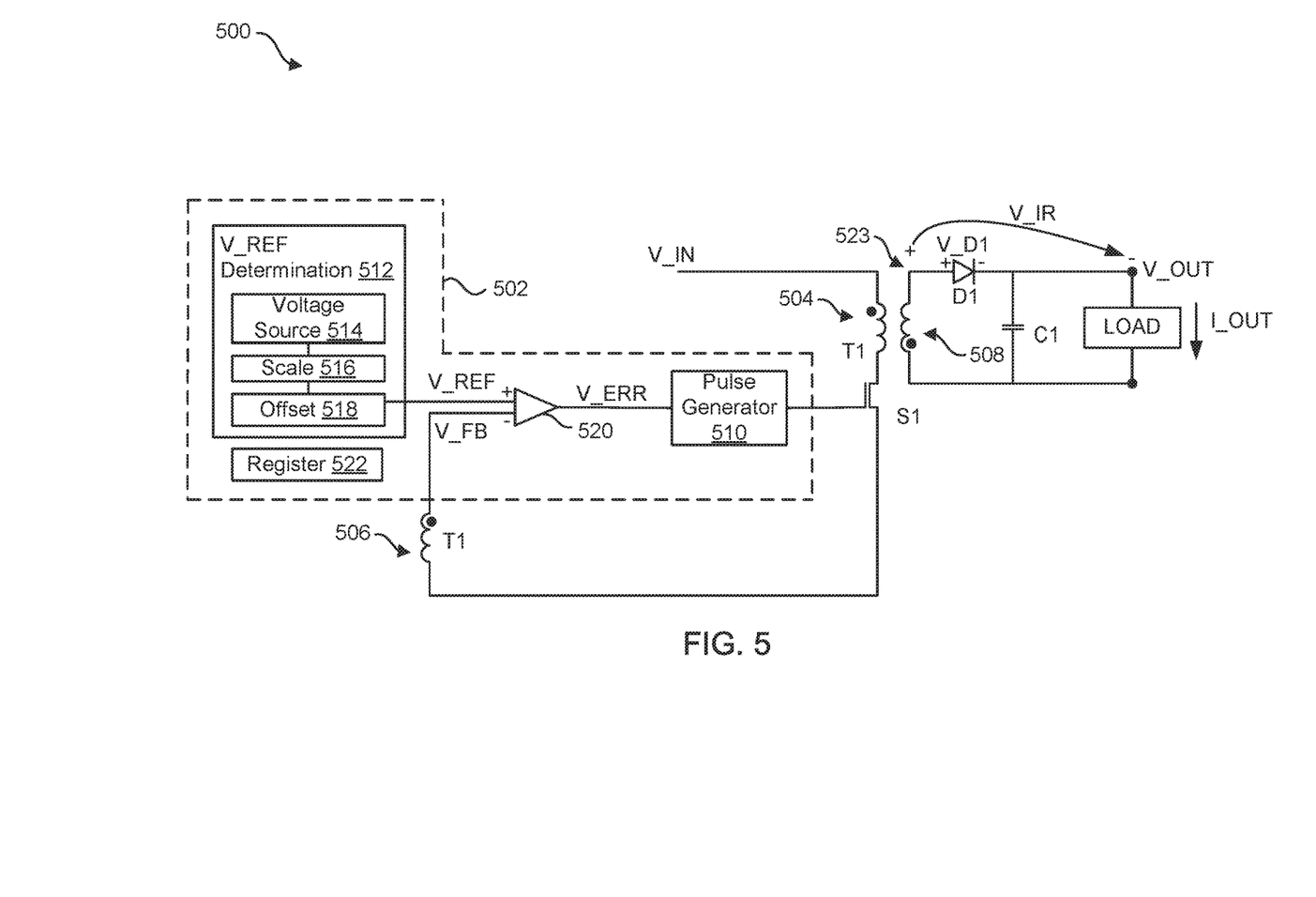
FIG. 5 is a diagram of a variable-level flyback converter in accordance with an embodiment of the disclosure.

FIG. 5 shows a multi-level power converter such as a variable-level flyback power converter 500 in accordance with an embodiment of the disclosure. Flyback converter 500 includes a switch control circuit or switch controller 502 configured to switch on and off a power switch S1. A rectified input voltage V_IN drives a primary winding 504 of a transformer T1 when switch controller 502 switches on power switch S1. Power switch S1 may be a bipolar junction transistor (BJT), which is driven to saturation when controller 502 drives a base current into the base of power switch S1. It will be appreciated that a metal-oxide-semiconductor field-effect transistor (MOSFET), which is driven to saturation when controller 502 provides a voltage above a threshold voltage at the base of power switch S1, may be used in alternative embodiments. To cycle power switch S1 on, controller 502 drives power switch S1 into saturation to turn power switch S1 on. Based on the input voltage V_IN and a magnetizing inductance for transformer T1, a collector current then ramps up from zero to a peak collector current value, whereupon controller 502 switches off power switch S1 to complete a switching cycle. The collector current is also the primary winding current for transformer T1.

Controller 502 includes a pulse generator 510 that provides pulse signals with on-times and off-times to switch S1. When controller 502 turns off power switch S1, a rectifying diode D1 (e.g., a Schottky diode with a low forward voltage drop and fast switching action or other diode) on the secondary side of transformer T1 becomes forward biased such that the stored energy in transformer T1 is delivered as an output voltage V_OUT across a load as filtered by a load capacitor C1. This delivery of energy to the load produces a voltage on an auxiliary winding 506, which may be referred to as the reflected voltage or the auxiliary winding voltage. This reflected voltage is a function of output voltage V_OUT, a voltage drop V_D1 across the diode D1, and voltage drop due to secondary losses V_IR. As the energy in transformer T1 is delivered and depleted, a secondary current in a secondary winding 508 of transformer T1 will drop to zero such that voltage drop due to secondary losses V_IR will be 0 V or approximately 0 V and the forward voltage drop V_D1 will be small (e.g., 0.2 V), whereupon the reflected voltage is proportional to the sum of output voltage V_OUT and forward voltage drop V_D1. As discussed above, this time is denoted as the transformer reset time T_RST and represents the ideal time to sample a feedback voltage V_FB by sensing the reflected voltage to obtain an accurate estimate of output voltage V_OUT.

Flyback converter 500 includes a reference voltage determination module 512, which may include a voltage source 514, a scaling module 516, and/or an offset module 518. Flyback converter 500 further includes a comparator 520 that compares a reference voltage V_REF received from reference voltage determination module 512 and feedback voltage V_FB to generate an error signal V_ERR. Pulse generator 510 provides the pulse signals with on-times and off-times to switch S1 responsive to error signal V_ERR received from comparator 520. Pulse generator 510 may be configured to perform pulse-width modulation and/or pulse-length modulation to generate the pulse signals for modulating the output voltage to the desired output voltage.

Voltage source 514 provides a fixed and consistent initial reference voltage V_REF0. For example, voltage source 514 may be a bandgap voltage reference circuit or other temperature independent voltage reference circuit that produces a fixed voltage regardless of power supply variations, temperature changes, and the load. Voltage source 514 may include a bandgap voltage reference circuit that provides a bandgap voltage (e.g., a voltage between 0.9 V and 1.3 V) and further a voltage amplifier such as an operational amplifier (op-amp) configured to provide a gain to the bandgap voltage.

For the default output voltage (e.g., 5 V), reference voltage determination module 512 provides initial reference voltage V_REF0, without scaling or offsetting, to comparator 520. For example, reference voltage determination module 512 may provide initial reference voltage V_REF0 of 5.2 V to comparator 520 to obtain an output voltage of 5 V, and the feedback voltage V_FB may be 5.2 V.

For higher output voltages, scaling module 516 scales initial reference voltage V_REF0 to a scaled reference voltage V_REFn. As discussed above, scaling initial reference voltage V_REF0 with the ratio of desired output voltage V_OUTn and initial output voltage V_OUT0 results in an incorrect output voltage.

On a cycle-by-cycle bases, an offset voltage V_F between the voltage at a node 523 and the output voltage V_OUT is fixed regardless of output voltage setting. Offset voltage V_F is provided by the sum of forward voltage drop V_D1 and secondary losses V_IR. Offset voltage V_F may be forward voltage drop V_D1 as secondary losses V_IR are negligible at transformer reset time T_RST. Reference voltages V_REFn for alternate output voltages V_OUTn can be adaptively set for various desired output voltage levels without offset voltage V_F negatively impacting the output voltage V_OUTn set point. The following formula describes adjustments to reference voltage V_REFn to provide the correct output voltage:

$$V_{REFn} = V_{REF0} \frac{(V_{OUTn} + V_F)}{(V_{OUT0} + V_F)}$$

where V_REF0=initial reference voltage for default output voltage setting (V_OUT0), V_OUTn=desired alternate output voltage, V_F=offset voltage between voltage at node 523 and initial output voltage V_OUT0, and V_REFn=reference voltage for desired alternate output voltage settings V_OUTn. The relation between V_OUT0, V_REF0, and V_F may be described as V_OUT0=V_REF0×k+V_F, where k is a scaling factor. Similarly, the relation between V_OUTn, V_REFn, and V_F may be described as V_OUTn=V_REFn×k+V_F, where k is the same scaling factor. These two equations may be used to derive the above formula.

For example, if the default output voltage V_OUT0 is 5 V, reference voltage V_REF0 is set at 5.2 V to obtain the default output voltage V_OUT0 (assuming a turns ratio N of 1), and the offset voltage V_F is 0.2 V, table 2 below shows the scaling ratio that may be used by power converter 500, in which offset voltage V_F is accounted for in the reference voltage V_REFn for corresponding alternate output voltage settings V_OUTn.

TABLE 2

| Desired V_OUT | Scaling Ratio | V_REF | V_OUT |
|---|---|---|---|
| +5.0 V | 1 | +5.2 V (Set at final test) | +5.0 V |
| +12.0 V | 2.3 (12.2/5.2) | +12.2 V | +12.0 V |
| +19.0 V | 3.7 (19.2/5.2) | +19.2 V | +19.0 V |

Scaling module 516 may scale initial reference voltage V_REF0 received from voltage source 514 by calculating (V_OUTn+V_F)/(V OUT0+V_F) on the fly responsive to receiving a requested output voltage signal. Default output voltage V_OUT0 and offset voltage V_F are fixed values, and desired alternate output voltage V_OUTn is variable. Desired alternate output voltage V_OUTn may be determined responsive to receiving a requested voltage signal. The offset voltage V_F may be a pre-set value such as 0.2 V based on the particular diode D1 (e.g., by looking at the specification or data sheet of diode D1 or based on testing and experience. The offset voltage V_F may be calibrated on certain hardware without an actual output diode for mass production, and the offset voltage V_F may be trimmed using traditional fuses or one-time programming (OTP) in other embodiments.

Each of controller 502, pulse generator 510, reference voltage determination module 512, and comparator 520 may include analog circuit components, digital circuit components, or both. For example, reference voltage determination module 512 may include digital circuits that perform one or more processes described above digitally. Reference voltage determination module 512 may determine desired output voltage V_OUTn in response to receiving a requested output voltage from a device to be charged and then calculate reference voltage V_REFn on the fly for the desired output voltage V_OUTn using:

$$V_{REFn} = V_{REF0} \frac{(V_{OUTn} + V_F)}{(V_{OUT0} + V_F)}$$

and store the calculated reference voltage V_REFn in a register 522. Comparator 520 may also be a digital circuit and may receive a desired output voltage V_OUTn signal from reference voltage determination module 512 and a feedback signal V_FB, and calculate the difference to provide an error signal. The error signal V_ERR may be provided to a digital-to-analogue circuit (DAC) to provide an analogue error signal, which may be provided to pulse generator 510.

In another embodiment, scaling module 516 may scale initial reference voltage V_REF0 received from voltage source 514 by using predetermined scaling ratios, for example those provided in table 2, stored in a memory such as register 522 in other embodiments.

In a further embodiment, reference voltage determination module 512 may first scale and then offset initial reference voltage $V_{REF0}$. The formula may be rearranged such that scaling and offset may be used to provide the correct output voltage:

$$V_{REFn} = \frac{V_{OUTn}}{(V_{OUT0} + V_F)} V_{REF0} + \frac{V_{REF0} \times V_F}{(V_{OUT0} + V_F)}$$

Scaling module 516 may scale initial reference voltage V_REF0 received from voltage source 514 by (V_OUTn)/(V_OUT0+V_F). As described above, default output voltage V_OUT0 and offset voltage V_F are fixed values, and desired alternate output voltage $V_{OUTn}$ is variable. Offset module 518 may offset scaled V_REF0 by adding (V_REF0×V_F)/(V_OUT0+V_F), which is a fixed value since initial reference voltage V_REF0 is also a fixed value. For example, if the default output voltage V_OUT0 is 5 V, reference voltage V_REF0 is set at 5.2 V to obtain the default output voltage V_OUT0 (assuming a turns ratio N of 1), and the offset voltage V_F is 0.2 V, initial reference voltage V_REF0 is scaled depending on desired alternate output voltage V_OUTn, and then offset by a fixed value of 0.2 V.

Pulse generator 510, reference voltage determination module 512, and comparator 520 may each be a part of controller 502 as shown in FIG. 5. In alternative embodiments, one or more of pulse generator 510, reference voltage determination module 512, and comparator 520 are implemented as separate components. Controller 502 and other components of flyback converter 500 are further described in U.S. Pat. No. 7,589,983, issued Sep. 15, 2009, the contents of which are hereby incorporated by reference in their entirety. Although not shown in FIG. 5, feedback signal V_FB is often scaled by a resister divider network such as a voltage divider or other such circuit as would be understood by one skilled in the art.

Figure 6:
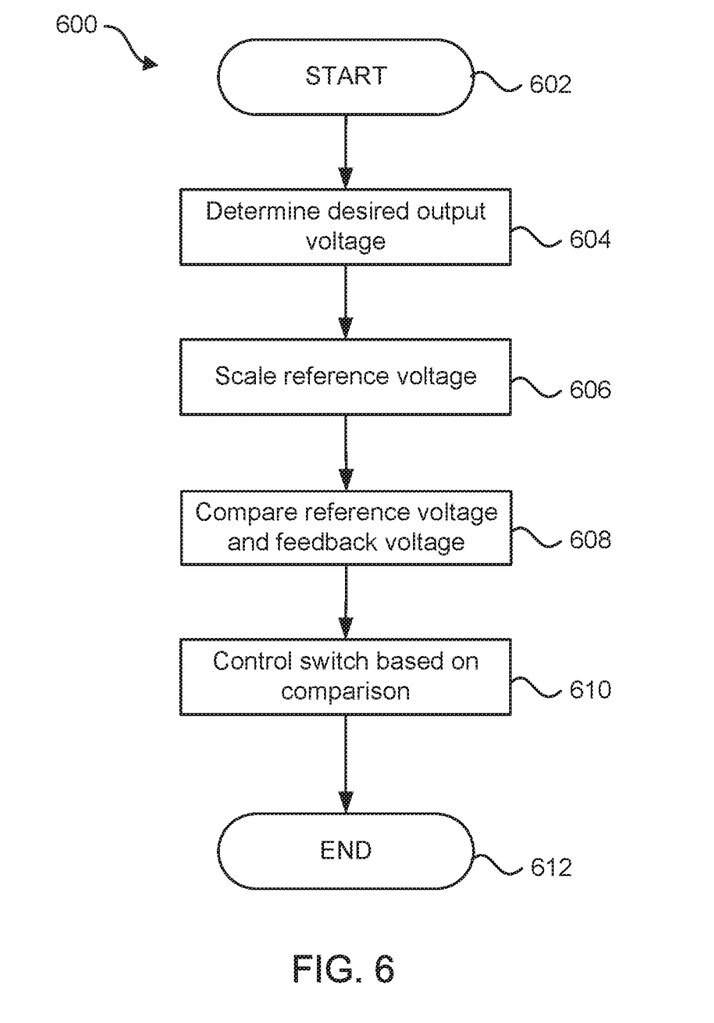
FIG. 6 shows a flowchart of a process for providing an output voltage at multiple regulation levels in accordance with an embodiment of the disclosure.

FIG. 6 shows a flowchart of a process 600 for providing an output voltage at multiple regulation levels in accordance with an embodiment of the disclosure.

At block 602, a device to be charged is connected to a flyback converter such as flyback converter 500 of FIG. 5.

At block 604, flyback converter 500 determines a desired output voltage. The desired output voltage may be a default voltage (e.g., 5 V) associated with an initial reference voltage, or an alternate output voltage (e.g., 9 V, 12, V, or 19 V) associated with a corresponding reference voltage. If the desired output voltage is the default voltage, block 606 may be skipped.

At block 606, flyback converter 500 scales initial reference voltage responsive to determining a desired output voltage. Flyback converter 500 may use the formula:

$$V_{REFn} = V_{REF0} \frac{(V_{OUTn} + V_F)}{(V_{OUT0} + V_F)}$$

as discussed above to scale (e.g., adjust a gain of the initial reference voltage) the initial reference voltage.

Flyback converter 500 may also offset the scaled initial reference voltage. For example, in embodiments in which scaling factor 516 use a scaling factor of (V_OUTn)/(V_OUT0+V_F), offset module 518 may add a fixed offset of (V_REF0×V_F)/(V_OUT0+V_F).

At block 608, flyback converter 500 compares the scaled reference voltage and a feedback voltage provided by sensing a reflected voltage at a primary auxiliary winding of a transformer T1. Flyback converter 500 may use comparator 520 to compare the scaled reference voltage and the feedback voltage to generate an error signal, which is provided to pulse generator 510.

At block 610, flyback converter 500 controls power switch S1 based on the comparison at block 610. Pulse generator 510 may modulate the pulse signal provided to switch S1 responsive to the error signal received from comparator 520. For example, pulse generator 510 may modulate the width of the pulse signal to modulate the output voltage.

At block 612, the device may be disconnected from the flyback converter 500.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter configured to provide at least a first desired output voltage and a second desired output voltage different from the first desired output voltage, comprising:
    a switch coupled to a primary winding of a transformer;
    a diode coupled to a secondary winding of the transformer; and
    a controller coupled to the switch and configured to:
        scale a first reference voltage by a scale factor to generate a second reference voltage, wherein the scale factor is based on the second desired output voltage and a forward voltage drop of the diode, wherein the first reference voltage corresponds to the first desired output voltage and the second reference voltage corresponds to the second desired output voltage, and wherein the scaling the first reference voltage comprises multiplying the first reference voltage by the scale factor, wherein the scale factor comprises the sum of the second desired output voltage and the forward voltage drop over the sum of the first desired output voltage and the forward voltage drop;
        compare the second reference voltage and a feedback voltage to generate an error signal; and
        modulate a pulse signal provided to the switch based on the error signal.

2. The switching power converter of claim 1, wherein the controller is configured to sense the feedback voltage at a primary-side auxiliary winding of the transformer.

3. The switching power converter of claim 2, wherein the controller is configured to sense the feedback voltage at a transformer reset time of the switching power converter.

4. The switching power converter of claim 1, wherein the controller comprises a reference voltage determination module configured to scale the first reference voltage, a comparator configured to compare the second reference voltage and the feedback voltage, and a pulse generator configured to modulate the pulse signal.

5. The switching power converter of claim 4, wherein the pulse generator is configured to modulate a width of the pulse signal.

6. The switching power converter of claim 4, wherein the voltage determination module comprises a voltage source configured to generate the first reference voltage and a scaling module configured to scale the first reference voltage.

7. The switching power converter of claim 1, wherein the value of the forward voltage drop and the first reference voltage is fixed.

8. A method for a switching power converter configured to provide at least a first desired output voltage and a second desired output voltage different from the first output voltage, comprising:
    scaling a first reference voltage by a scale factor to generate a second reference voltage, wherein the scale factor is based on the second desired output voltage and a forward voltage drop of a diode coupled to a secondary winding of a transformer, wherein the first reference voltage corresponds to the first desired output voltage and the second reference voltage corresponds to the second desired output voltage, and wherein the scaling of the first reference voltage comprises multiplying the first reference voltage by the scale factor, wherein the scale factor comprises the sum of the second desired output voltage and the forward voltage drop over the sum of the first desired output voltage and the forward voltage drop,
    comparing the second reference voltage with a feedback voltage to generate an error signal; and
    modulating a pulse signal provided to a switch coupled to a primary winding of the transformer based on the error signal.

9. The method of claim 8, further comprising sensing the feedback voltage at a primary-side auxiliary winding of the transformer.

10. The method of claim 9, wherein the sensing is performed at a transformer reset time of the switching power converter.

11. The method of claim 8, further comprising converting the error signal to an analogue error signal, wherein the modulating is based on the analogue error signal.

12. The method of claim 8, wherein the modulating comprises modulating a width of the pulse signal.

13. The method of claim 8, further comprising generating the first reference voltage by a fixed voltage source.

14. The method of claim 8, wherein the value of the forward voltage drop and the first reference voltage is predetermined.

* * * * *